F. POOLE.
LIQUID HEATER.
APPLICATION FILED FEB. 2, 1915.
1,215,703.
Patented Feb. 13, 1917.
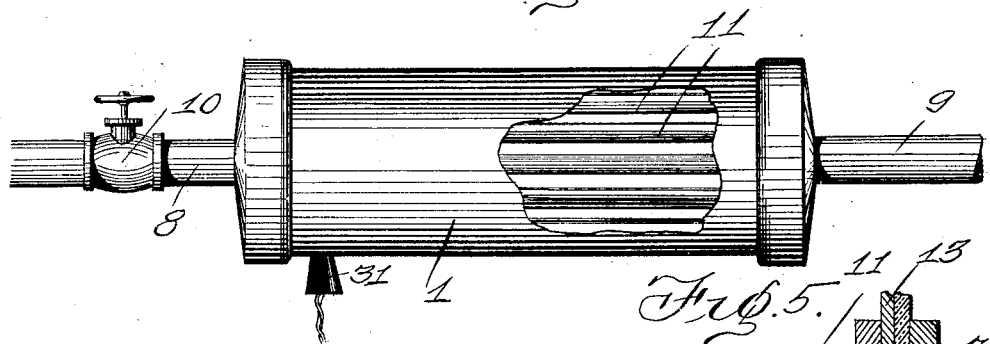
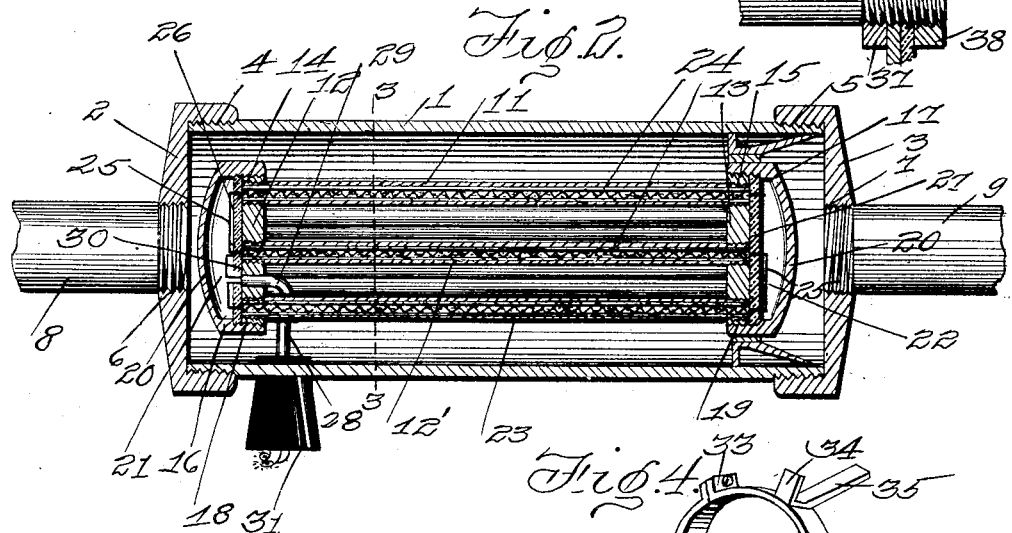
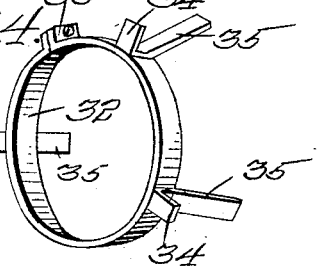
Inventor
Fred Poole,
By Richard Bowen,
Attorney

UNITED STATES PATENT OFFICE.

FRED POOLE, OF JEWELL, KANSAS.

LIQUID-HEATER.

1,215,703.  Specification of Letters Patent.  Patented Feb. 13, 1917.

Application filed February 2, 1915. Serial No. 5,741.

*To all whom it may concern:*

Be it known that I, FRED POOLE, a citizen of the United States, residing at Jewell, in the county of Jewell and State of Kansas, have invented certain new and useful Improvements in Liquid-Heaters, of which the following is a specification.

My invention relates to liquid heaters, and more particularly to that class of liquid heaters termed "instantaneous", and consists broadly of a casing capable of being interposed in a pipe line whereby to heat a liquid passing therethrough.

The primary object of my invention is to provide an improved heater structure capable of reception within a casing provided therefor, said casing being interposed in a pipe line or water conduit.

Another object of my invention resides in the provision of a peculiarly constructed supporting means for said heating device.

A still further object of my invention is to provide a heating member which will be capable of removal from the casing whereby the parts thereof may be repaired or replaced.

A still further object of my invention is to provide a heater for a device of the above class which comprises preferably a plurality of heating members, each member containing an electric heating unit, means for supporting said heating member in spaced relation and a pair of junction boxes disposed at the respective ends of said heating members for a purpose which will hereinafter be set forth.

With the above and other objects in view my invention resides preferably in the construction, combination, and arrangement of parts as hereinafter set forth in the specification and illustrated in the accompanying drawing, in which—

Figure 1 is a side elevation of a form of my invention, a portion of the same being broken away to illustrate the interior arrangement.

Fig. 2 is a longitudinal sectional view of the same.

Fig. 3 is a transverse sectional view taken on the line 3—3 of Fig. 2 looking in the direction of the arrows.

Fig. 4 is a detail perspective view of a spacing and supporting member which I provide, and Fig. 5 is a detail sectional view of a modification of one of the parts of my invention.

Similar reference characters indicate similar parts throughout the various views of the drawing.

Referring more particularly to the drawing in which the preferred embodiment of my invention is illustrated, the numeral 1 indicates a casing substantially cylindrical in contour and open at each end. The open ends of said casing are closed by means of screw caps 2 and 3, the said screw caps 2 and 3 being in threaded engagement with the outer periphery of the casing 1 as shown at 4 and 5 respectively. The said caps 2 and 3 are provided with centrally located apertures, the said apertures being in screw threaded engagement as shown at 6 and 7, respectively, with a water conduit, an inlet portion 8 being shown, and a continuance thereof being indicated at 9. A controlling valve 10 is provided for an obvious purpose. From the above it will be seen that liquid passing through the conduit 8, controllable by the valve 10 will pass through the casing 1 and continue to the other end thereof and out through the pipe 9.

The heater which I provide in this form of my invention preferably comprises a plurality of parallel spaced-apart tubular members 11, the said tubular members 11 being arranged circumferentially in supporting plates 12 and 13, this peculiar arrangement being illustrated to advantage in Fig. 3. The space existing between the circumferentially arranged members 11 is utilized by one or more heating members, one being shown and designated by the numeral 12'. This particular arrangement need not be resorted to in every instance, however, this being the preferred construction and I have found it to be an arrangement which is successful and advantageous in operation.

The supporting plates 12 and 13 may be in threaded engagement with the tubular heating members 11 and 12' as indicated at 14 and 15 respectively. It is preferred that the opposite extremities of each of the tubular members 11 be oppositely threaded so that rotation in one direction will insure simultaneous engagement of the tubular members with the plates 12 and 13. However, the specific manner in which these tubular members engage the plates 12 and 13 may be altered in any manner which may be found advantageous, any of the many means for joining plates and tubes of this character may be used. The outer peripheries of the plates 12 and 13 are threaded, these outer peripheries being adapted to receive screw caps 16 and 17 respectively, the said screw caps being in threaded engagement with the said plates 12 and 13 as indicated at 18 and 19 respectively. It will be noted that the screw caps 16 and 17 are each concavo-convex as indicated at 20 so as to provide header chambers 21 and 22, respectively, which may be illustrated as junction boxes in which suitable connections may be made for a purpose which will hereinafter become apparent. From the above, it will be seen that the tubular members 11 are supported in parallel spaced relation within the casing 1, and that the parts are readily interchangeable for removal or replacement.

Each of the tubular members 11 is provided with an inner coating or lining of insulating material designated 23, and electric heating units 24 are disposed in each of the tubular members 11, these heating units being of any approved type, a coiled wire being diagrammatically indicated in the drawing. The terminals of each of the heating units protrude from the perspective open ends of the tubular members 11 as indicated at 25, so that suitable electrical communication may be established between the respective heating units. Each of the screw caps 16 and 17 are provided with insulating plates 26 and 27, respectively, said insulating plates being for the purpose of preventing accidental contact of the lead wires with the metallic portions of the tubes 11 or caps 16 and 17. Insulating plates 26 and 27 may be removable or may be of a material such as porcelain or an insulating cement of any kind for retaining the wires 25 in any desired relation.

In order to afford electrical communication from an external source to the heating units 24 a tubular support 28 is provided, the said tubular support 28 being carried by the casing 1 and bent at its extremity as shown at 29 for engagement with the supporting plate 12 as indicated at 30. This supporting member 28 performs a twofold function, namely, supports the heater structure substantially concentrically within the casing 1, and affords a means for carrying electric conductors for connection with the heating units 24. Any suitable detachable connector may be employed for connecting the exterior source of electric energy to the lead 25, but I prefer to employ the detachable plug shown, this plug being indicated as a whole by the numeral 31. In order to support the extremity of the heating device which is remote from the support 28, I provide a spacing and supporting frame which comprises an expandible ring 32 having clamping means 33 formed thereon, the said ring 32 being receivable over the cap 17 and engageable with the outer periphery thereof as indicated to advantage in Fig. 2, the said ring 32 being provided with a plurality of legs having radially extending portions 34 and radially and laterally extending portions 35. The portions 34 are substantially at right angles to the ring 32, whereas the portions 35 are slightly longer and are disposed at substantially an acute angle to the ring 32. It will be seen that the members 34 engage the inner periphery of the casing which support the heating member in spaced relation thereto, and the members 35 engage the cap 3 so as to prevent longitudinal movement in the direction of the heater. While I have shown only one of these spacing frames, it will be readily understood that any number of the same may be employed, and that the relative positions may be altered to meet the requirement of each specific case.

In Fig. 5 I have illustrated a modification of my invention which is properly a modification of the joint between the tubular members and the supporting plates 12 and 13, and in this instance the extremities of each of the tubular members 11 are threaded as indicated at 36 and a pair of nuts 37 and 38 are carried by the said threaded portion 36, and one of the supporting plates 12 and 13 is receivable between the said nuts 37 and 38, the said nuts embracing the said plate adjacent the aperture therein and thereby retaining the threaded extremities of each of the tubular members 11 in place. This construction allows of ready removal of the tubular members 11 and facilitates removal and replacement of the parts. From the above description taken in connection with the accompanying drawing, it is thought that a clear and comprehensive understanding of the construction, operation, and advantages of my invention may be had. It will be noted that when liquid is allowed to flow through the casing its path will be changed by the cap 16, causing the liquid to pass therearound and mingle on the opposite side thereof thereby insuring its circulation around and along the respective surfaces of the tubular heating members 11. It will be noted that the disposition of the tubular members 11 in the casing 1 provides a wide heating area, but it will be understood that the shape of these tubular members 11 may be changed to meet various requirements, it having been found expedient at times to coil the tubular members 11 which greatly enhances the efficiency of the device.

While I have shown and described my invention as possessing a peculiar form and construction, it is desired that it be understood that I may make such changes in the details thereof that do not depart from the spirit and scope of the invention as claimed.

Having thus described my invention, what I claim and desire to secure by Letters Patent, is:

1. A liquid heater, including a casing interposed in a water conduit or the like, a heating device associated therewith comprising a plurality of parallel spaced apart tubular heat radiating members, end plates for supporting said tubular heat radiating members, an electric heating unit associated with each of said tubular heat radiating members, protecting caps carried by said end plates for preventing the contacting of the fluid with the end connections of the electric heating elements, and means carried by one of said caps to support said heating device and prevent longitudinal movement thereof in one direction.

2. A liquid heater, including a casing interposed in a liquid conduit, a heating device comprising a plurality of tubular members in parallel spaced arrangement having each a heating unit, end plates for supporting said tubular members, caps threaded on said end plates to form housings to protect the end connections of the heating units from the fluid, and means for supporting said structure within the casing.

3. A liquid heater, including a casing interposed in a pipe line, a plurality of tubular members in parallel spaced arrangement, end plates, said tubular members having threaded connection with the end plates, insulating means on the plates, and protecting caps threaded on the peripheries of the plates to house the end connections of the heating units from the fluid.

4. A liquid heater, including a casing interposed in a pipe line, a heating device carried in said casing comprising a plurality of spaced parallel arranged tubes, end plates for supporting said tubes, protecting caps carried by said end plates for preventing the contacting of the fluid with the end connection of the heating element, means for supporting one end of said heating device in said casing, and means on the opposite end comprising a band having legs thereon for maintaining said heating device in spaced relation to the inner periphery of said casing.

In testimony whereof I affix my signature in presence of two witnesses.

FRED POOLE.

Witnesses:
FRED. V. KREAMER,
A. C. ELY.

Copies of this patent may be obtained for five cents each, by addressing the "Commissioner of Patents, Washington, D. C."